United States Patent Office 2,820,898
Patented Jan. 21, 1958

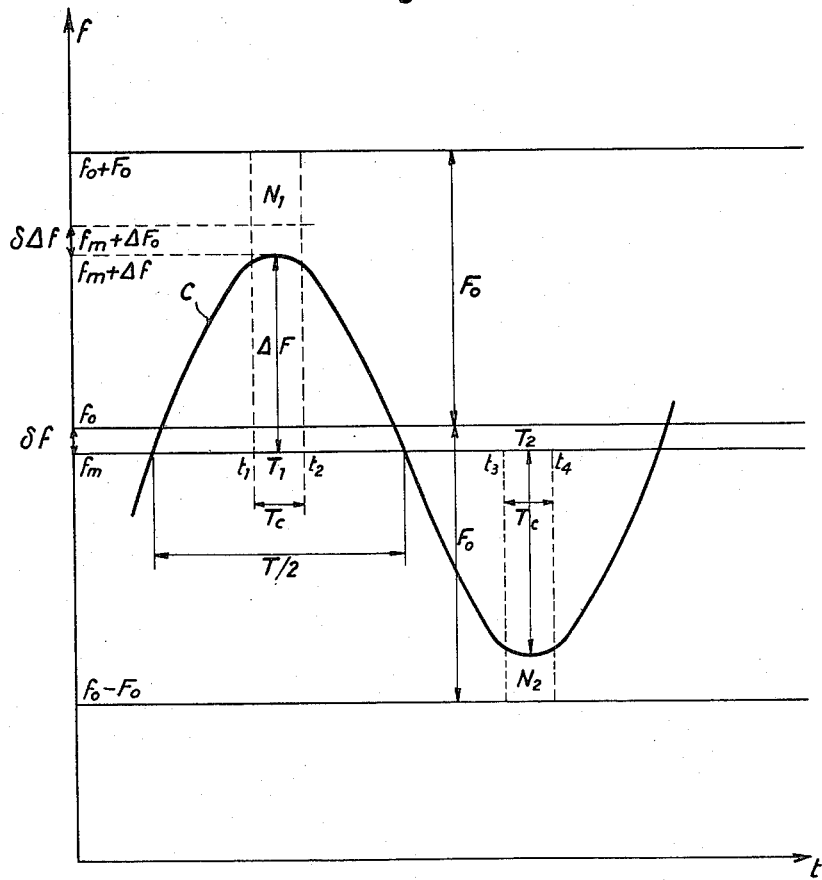

2,820,898

DISTANCE MEASURING EQUIPMENT UTILIZING FREQUENCY MODULATION

Henri Familier and Basile Ginger, Paris, France, assignors to Compagnie Generale de Telegraphie Sans Fil, a corporation of France Application June 22, 1954, Serial No. 438,502

Claims priority, application France July 2, 1953

3 Claims. (Cl. 250—36)

The invention relates to distance measuring equipment utilizing frequency modulation, and the beating in a receiver of the wave directly transmitted by a frequency-modulated transmitter with the wave reflected by an object, the distance to which is to be measured. It is known that in such equipment, the distance $d$ to be measured is given by the equation:

$$d = \frac{KT}{\Delta F} f_b \tag{1}$$

where $\Delta F$ is the frequency deviation.

$f_b$, the beat frequency between the wave transmitted and the wave received, measured by a distance measuring indicator, which may be a frequency meter, a discriminator or a discontinuous counting device.

$T$ the modulation period, and $K$ a constant of proportionality, whose value depends on the law of modulation adopted.

Hence the distance $d$ to be measured is furnished by the measurement of the beat frequency $f_b$ with an accuracy that is the greater as the variations in three parameters $K$, $T$ and $\Delta F$ are smaller. If it is assumed that the modulation period $T$ is constant, since it is generally furnished by a piezoelectric oscillator, the problem consists in satisfying the two following conditions:

(a) The form of the modulation, which determines the factor $K$, must not vary in the course of the measurement, which condition is generally satisfied with sufficient accuracy.

(b) The frequency deviation $\Delta F$ must remain constant.

This last condition concerns the problem of stabilizing the value of $\Delta F$. Once this problem is solved, the distance to be measured is proportional to the beat frequency and the determination of the value of this constant of proportionality in a manner as accurate as possible concerns the problem of calibration.

Most methods of calibration and stabilization of the value of $\Delta F$, which have been proposed, possess one grave disadvantage: the accuracy of calibration depends on the stability of the mean frequency of the transmitter.

The present invention has as an object the provision of a device permitting the stabilization with a great accuracy of the frequency deviation $\Delta F$, of the transmitter. Over and above, the invention permits the simultaneous stabilization of the rated mean frequency of the transmitter.

According to the invention this device comprises:

A quartz-stabilized oscillator amplitude modulating a second oscillator whose frequency is equal to the mean frequency chosen for the transmitter of the D. M. E. or at least closely proximate to the latter. At the output of this second oscillator, there is thus received a wave having the frequency of this second oscillator and two waves of frequency corresponding to the two side bands resulting from this modulation. The frequency of the first oscillator is so selected that the frequency of the first side band is always less than the minimum frequency of the D. M. E. and that the second band always greater than the maximum frequency of the latter;

A mixer, receiving the three waves furnished by the second oscillator and furthermore the frequency-modulated wave furnished by the transmitter of the D. M. E.;

An L. F. low-pass filter, permitting the lowest frequency resulting from this mixing to be selected at each instant;

A synchronizing system, whereby the beat frequencies thus obtained can only be utilized during intervals of time which are periodically repeated, these intervals of time comprising respectively the successive instants when the frequency of the transmitter is in the neighborhood of its maximum value or of its minimum value. The unit is so arranged that, during these instants, the filter selects the best frequencies between the wave transmitted by the transmitter and one of the two side bands of the second oscillator;

Means for counting the beat alternations during two successive intervals;

Means whereby it is possible to extract from the sum and the difference of the two numbers of beat alternations thus obtained, two parameters, for example two voltages, one of which permits a determination and a stabilization of the frequency deviation of the transmitter, and the other permitting a stabilization of the mean frequency of this transmitter.

These means are, for example, discriminators, well known in the prior art, for detecting frequency modulated waves.

The invention will be better understood from the accompanying drawings and the ensuing description referring thereto, illustrating and describing by way of example one illustrative mode of carrying out the invention.

Fig. 2 shows curves explaining the principle of the invention.

Figure 1:
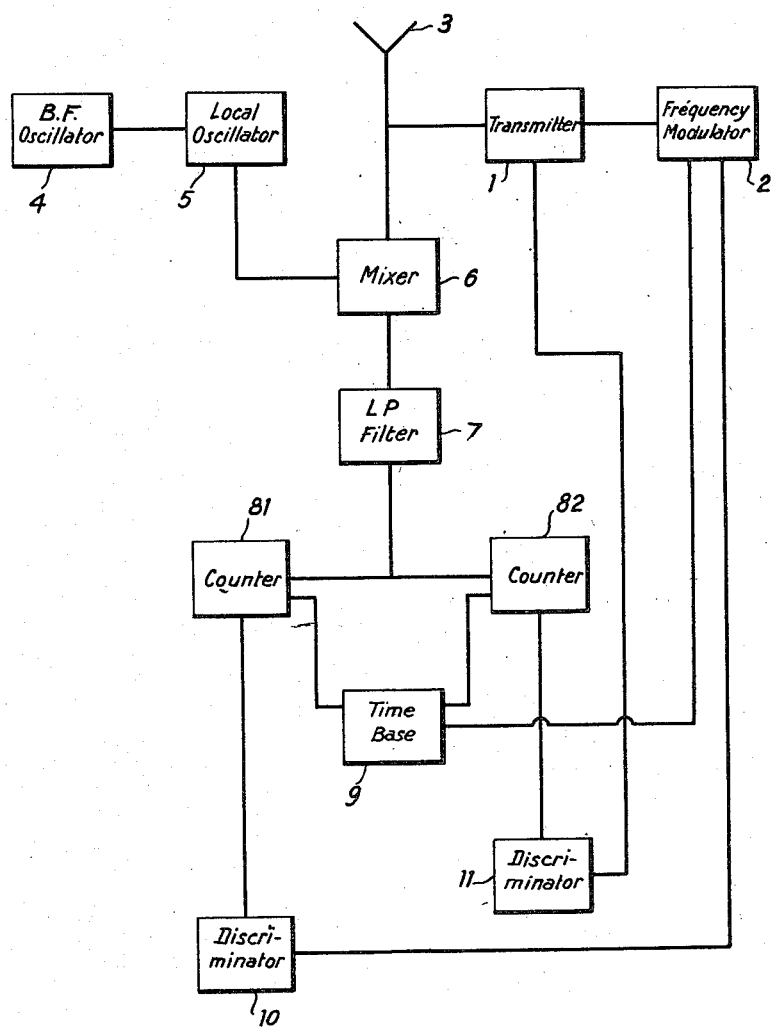
Fig. 1 is a diagram of an assembly embodying the invention.

With reference to Fig. 1, a transmitter 1, frequency modulated by a modulator 2, and having a maximum frequency deviation $\Delta F$ feeds a transmitting antenna 3. An auxiliary oscillator 4, stabilized by quartz to the frequence $F_0$, modulates in amplitude a reference oscillator 5 tuned to the frequency $f_0$. A mixer 6 receives a part of the frequency-modulated energy furnished by the transmitter 1 and, furthermore, the carrier frequency $f_0$ and the side band frequencies $f_0 \pm F_0$ furnished by the modulated oscillator 5. The beat alternations produced by the mixer 6 are, after passing through a low-pass filter 7, applied to two electronic counters 81 and 82. A time base device ensures the necessary synchronization between the counters 81 and 82 and the modulator 2. Such a time base device well known in the preior art is a device, which, from an oscillator operating at fixed frequency, derives a plurality of controlling pulses of fixed recurrent frequencies. These pulses are used for controlling a unit which must periodically operate. Electronic counters are also well known in the prior art, for example, see "MIT-Vol. 19—Waveforms—Chap.: Counting. The electronic counter 81 gives, by way of the device 10, a first voltage by means of which it is possible to stabilize and measure the value of the frequency deviation of the transmitter 1 and a second error voltage, applied by way of the device 11, by means of which it is possible to stabilize the mean frequency of the transmitter 1.

With reference to Fig. 2, the curve C represents the variations as a function of time $t$ of the frequency transmitted by the transmitter 1. The curve C represents a sinusoidal law of modulation, but the method is still valid for other modulation laws which are symmetrical or otherwise, but are continuous in the regions where the first derivatives are equal to zero. The transmitted frequency of the mean value $f_m$ varies between $f_m+\Delta F$ and $f_m-\Delta F$. Also shown in this figure are the straight lines corresponding respectively to the frequency $f_0$ of the oscillator 5, which may be different from $f_m$, and to the side bands $f_0-F_0$, $f_0+F_0$.

The device according to the invention is adapted to count the number of beat alternations which are produced;

From $t_1$ to $t_2$, between the transmitted frequency in the neighborhood of $f_m+\Delta F$ and the frequency of the upper side band $f_0+F_0$ (say $N_1$ during a time $T_c$).

From $t_3$ to $t_4$, between the transmitted frequency in the neighborhood for $f_m-\Delta F$ and the frequency of the lower side band $f_0-F_0$ (say $N_2$ during a time $T_c$) with $T_c = t_2-t_1 = t_4-t_3$.

The instants corresponding to the start and finish of the counting $t_1$, $t_2$, $t_3$ and $t_4$ are perfectly defined from the time base device 9 controlled by a quartz and synchronized with the modulator, which ensures that the counting period $T_c$ is constant.

Assuming that $\Delta F$ is the actual frequency deviation of the transmitter either side of its mean frequency $f_m$, $\Delta F_0$ the calculated frequency deviation of this transmitter for which frequency deviation the D. M. E. gives correct results, it is supposed that:

$$|f_m - f_0| \leqslant \delta f \qquad (2)$$

$$|\Delta F - \Delta F_0| \leqslant \delta \Delta F \qquad (3)$$

$\delta F$, $\delta \Delta F$ being magnitudes known in advance.

In other words, it will be supposed that $f_m$ and $\Delta F$ do not deviate by more than these respective magnitudes from the calculated values $f_0$ and $\Delta F_0$.

The frequency $F_0$ of the oscillator 4 is so selected as to satisfy the two following inequalities:

1. $$F_0 \geqslant \Delta F_0 + \delta \Delta F + \delta f \qquad (4)$$

This inequality expresses that the frequency of the wave transmitted by the transmitter 1 is always comprised between the two side bands transmitted by the oscillator 5.

2. $$F_0 \leqslant 2(\Delta F_0 - \delta \Delta F - \delta f) \qquad (5)$$

This second inequality expresses that, at the times $T_1$ or $T_2$ corresponding respectively to the maximum frequency and the minimum frequency of the transmitter, the frequencies $f_0+F_0$, $f_0-F_0$ are nearer the frequency transmitted by the transmitter than the frequency $f_0$.

The filter 7 is so calculated as to select always the lowest frequency resulting from the mixing in the mixer 6. From the time $t_1$ to the time $t_2$ under these conditions the frequency $f_0+F_0-f$ passes through. From the time $t_3$ to the time $t_4$, it allows the frequency $f-(f_0-F_0)$ to pass, $f$ being the instantaneous frequency of the wave transmitted by the transmitter, which frequency may be written $f = f_m + \Delta F g(t)$, $g(t)$ being the law of modulation.

The counter 81 counts the number of beats N1+N2 during the intervals of time $t_1-t_2$, $t_3-t_4$ occurring during each modulation period. The time base device 9 returns it to zero at the end of each modulation period.

A simple calculation shows that, in the hypothesis according to which the law of modulation gives a curve C symmetrical with respect to the axis of the frequencies, the number $N = N_1 + N_2$, is equal to:

$$N = p F_0 T \left(1 - \alpha \frac{I_c}{p}\right) \qquad (6)$$

in which:

$$p = \frac{2T_c}{T}$$

$$\alpha = \frac{\Delta F}{F_0}$$

$$I_c = \frac{1}{T}\int_{t_1}^{t_2} g(t)dt + \frac{1}{T}\int_{t_3}^{t_4} g(t)dt$$

It is found that number N is independent of $f_0$ and $f_m$. It depends merely on $\Delta F$ and may therefore serve to determine accurately the value of $\Delta F$.

From this number N, the discriminator 10 obtains a voltage proportional thereto. This voltage may serve, as in Fig. 1, as an error voltage for stabilizing the modulator 2 on the deviation frequency $\Delta F$. It may also be utilized for the purpose of calibration and thus permit ascertaining the exact value of $\Delta F$ and, in consequence, of the ratio $$\frac{KT}{\Delta F}$$

of the Formula 1. The first operation is that of stabilization, and the second that of calibration.

The choice of the parameter $p$ depends on the operation it is desired to effect. For stabilization, it is advantageous to take a relatively high parameter $p$ so as to obtain that the number N be as high as possible and thereby obtain high sensitivity.

For calibration, accuracy is of prime importance, in consequence the beat alternations should be counted only over periods of time of sufficiently short duration so that during this time $\Delta F g(t)$ can be fairly near $\Delta F$. Thus a smaller parameter $p$ is taken.

In general $p$ is always taken of the order of $\frac{1}{20}$.

On the other hand, it has been seen that the Equation 6 is valid whatever the modulation law, provided it is symmetrical.

It may be, furthermore, demonstrated that:

$$M = N_1 - N_2 = pT(f_m - f_0) \qquad (7)$$

The counter 82, also controlled by the time base device 9, is a counter which differs from the counter 81 only inasmuch as its return to zero occurs at the end of each half-period of modulation. Thus it counts alternately $N_1$ and $N_2$. The device 11 furnishes a voltage proportional to $(N_1-N_2)$.

This error voltage is fed to a stage of the transmitter 1 and may serve to bring its mean frequency $f_m$ to the desired frequency $f_0$.

It has been assumed in the foregoing that the modulation voltage was represented by a symmetrical curve as a function of time. The present device also permits the stabilization and the calibration of a D. M. E. when the law of modulation is not symmetrical. The sole condition to be satisfied is that the curve C have no discontinuity in the intervals of time such as $t_1-t_2$, $t_3-t_4$. An intuitive reasoning shows that this is so.

Referring to Fig. 2, it will be first assumed that $f_m$ varies and increases in value for example, $\Delta F$ remaining fixed. In this case the curve C is bodily displaced upwardly. It is obvious that $N_1$ decreases while $N_2$ increases, and it may be assumed intuitively that $N_1+N_2$ remains constant while $N_1-N_2$ varies and decreases in the present case. It would increase in the opposite case.

It will now be supposed that $f_m$ remains constant while $\Delta F$ varies and for example decreases. It is obvious that in this case the curve C flattens and $N_1$ and $N_2$ increase as well as the sum $N_1+N_2$, $N_1-N_2$ remaining constant. The reverse occurs in the opposite case.

The Formulas 6 and 7 are no longer valid but it will be understood that the counters 81 and 82 are capable of giving in this case error voltages permitting a stabilization of $f_m$ and $\Delta F$.

What we claim is:

1. A radioelectrical frequency modulated distance measuring equipment, of the type comprising: a transmitter with an output, for emitting ultra high frequency energy, a stabilized modulator for frequency modulating said energy according a recurrent law, the frequency thus obtained varying continuously with time, between a maximum and a minimum frequency, comprising further a calibrating and stabilizing device, said device comprising: a first oscillator having an output and operating at a frequency substantially equal to the mean frequency of said transmitter, means for amplitude modulating said first oscillator, said means comprising a second stabilized oscillator operating at a fixed modulating frequency so as to produce energy respectively at said mean frequency and at a first and a second side frequency, said fixed modulating frequency being such that the first side frequency is always higher than, but in the vicinity of, said maximum frequency of said transmitter, and the second side frequency is always lower than, but in the vicinity of, said minimum frequency of said transmitter; a mixer having a first and a second input, and an output, said first input being connected to said output of said first oscillator, said second input being connected to said output of said transmitter; a low pass filter, with an input and an output, said input of said low pass filter being connected to said output of said mixer, for filtering the lowest frequency produced by the mixing in said mixer of said energies respectively produced by said first oscillator and said transmitter; a first counter having an input and an output, means for connecting said input of said first counter to said output of said filter; means for causing said counter to count the beats produced by said mixer, during fixed periods of equal duration, the respective beginnings and ends of said fixed periods being in the vicinity of the successive times at which the frequency of said transmitter is respectively maximum, and minimum, and the middle of said periods being substantially said successive times; means for bringing back to zero said counter after each period of modulation of said transmitter; the both last mentioned functions being assumed by a time base device, a discriminator with an input and an output, said input being connected to the output of said first counter, and means for collecting at said output of said discriminator a voltage proportional to the beats counted by said first counter.

2. A calibrating and stabilizing device according to claim 1, further comprising means for feeding to said modulator said voltage proportional to the beats counted by said first counter.

3. A stabilizing and calibrating device according to claim 1, further comprising a second counter having an input and an output, means for connecting said input of said second counter to said output of said filter; means for causing said second counter to count the beats produced by said mixer, during said fixed periods of equal duration, means for bringing back to zero said second counter after each of said periods, the both last functions being assumed by the said time base device and a discriminator with an input and an output, said input being connected to the output of said second counter, and means for collecting at said output of said second counter a voltage proportional to the difference between the numbers of beats counted by said second counter, during two successive periods, means for feeding said voltage to said transmitter.

References Cited in the file of this patent
UNITED STATES PATENTS

| 2,543,058 | Ranger | Feb. 27, 1951 |

FOREIGN PATENTS

| 986,723 | France | Apr. 4, 1951 |